Dec. 24, 1963  F. G. STENGEL  3,115,447
NUCLEAR REACTOR FUEL ELEMENT ASSEMBLY
Filed Sept. 26, 1961  3 Sheets-Sheet 1
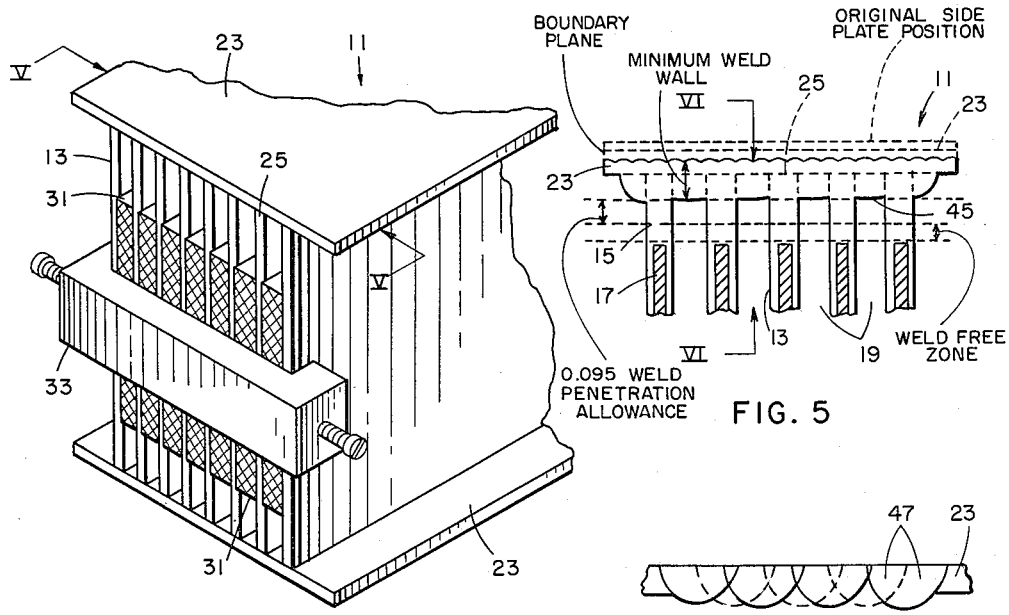
FIG. 1
FIG. 5
FIG. 6
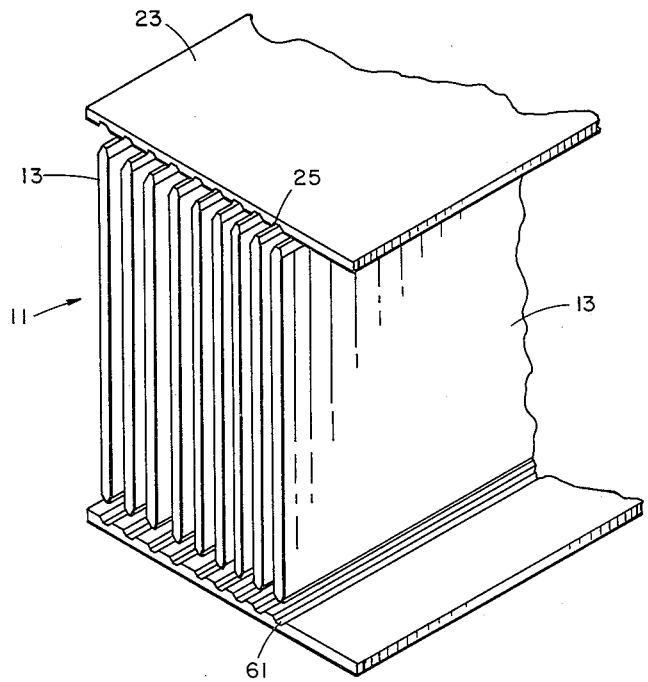
FIG. 9
INVENTOR.
FREDERICK G. STENGEL
BY Dec. 24, 1963   F. G. STENGEL   3,115,447
NUCLEAR REACTOR FUEL ELEMENT ASSEMBLY
Filed Sept. 26, 1961   3 Sheets-Sheet 2

INVENTOR.
FREDERICK G. STENGEL
BY

INVENTOR.
FREDERICK G. STENGEL

United States Patent Office 3,115,447
Patented Dec. 24, 1963

3,115,447
NUCLEAR REACTOR FUEL ELEMENT ASSEMBLY
Frederick G. Stengel, Bridgeville, Pa., assignor, by mesne assignments, to the United States of America as represented by the United States Atomic Energy Commission
Filed Sept. 26, 1961, Ser. No. 140,961
6 Claims. (Cl. 204—154.2)

This invention relates generally to the assembly of nuclear reactor fuel elements and more particularly to an improved method for assembling and fabricating multi-plate nuclear reactor fuel element assemblies.

In conventional nuclear reactors, such as the Shippingport neutronic reactor described in "The Shippingport Pressurized Water Reactor" prepared by the United States Atomic Energy Commission in 1958, suitable reactive fuel element fillers or wafers have been carefully encased in suitable protective envelopes to form flat fuel plate elements. These elements have been finish machined and design steel flange strips have been carefully welded on the sides of the envelopes to form fuel plate elements having an I-beam cross-section. Then the fuel plate flanges have been finished and butted to form seams along their flanges and these seams have been connected by fusion arc welding in a hermetically sealed inert gas welding chamber to form a fuel plate bundle or assembly with parallel open ended channels therein.

This system has been disadvantageous because it has required finish machining in several operations to provide an assembly having the precise properties and dimensions that have been necessary in the reactors. Also, this system has required expensive components and finishing costs and time-consuming upsetting and welding totaling up to about ten hours for one normal fusion seam welding cycle. Moreover, it has necessitated tracking of the seam welds, i.e., operator guidance of the welding arc, and has resulted in serious manufacturing difficulties such as uneven yields, poor tolerances, shrinkage, distortion, and poor dimensional control. Various schemes for circumventing these difficulties, including sub-assembly procedures, have been tried but these have been unsuccessful because they have also involved time-consuming and expensive machining and finishing of the elements and have given rise to strength problems and poor resistance to fretting and crevice corrosion.

In accordance with this invention, a simple, efficient system is provided in which flat nuclear flange-free reactor fuel plates are joined to a flat side plate by means of overlapping, cross-welds relative to the fuel plates. More particularly, this invention contemplates a method of fabricating a nuclear reactor fuel element assembly having a plurality of spaced parallel longitudinally extending flat fuel elements comprising the steps of holding said fuel elements in spaced relation normal to flat side plates, and passing a welding means along the outside of said side plates with transverse and longitudinal travel relative to said fuel elements to form overlapping cross-welds relative to said fuel elements that join said fuel elements to said side plate and said fuel elements to each other with a weld that bridges the channels between the fuel elements.

The above and further novel features of the invention will appear more fully from the following detailed description when the same is read in connection with the accompanying drawings. It is to be expressly understood, however, that the drawings are not intended as a definition of the invention, but are for the purpose of illustration only.

In the drawings, where like parts are marked alike:

FIG. 1 is a partial isometric view of nuclear fuel plates arranged for welding in accordance with this invention;

FIG. 5 is a partial cross-section through V—V of the fuel elements and side plate of FIG. 1 welded with the apparatus of FIGS. 2 and 3;

FIG. 6 is a partial cross-section through VI—VI of the cross-welds of FIG. 5;

FIG. 9 is a partial isometric view of the fuel elements and side plates of FIG. 1 with interfitting grooves therein.

Figure 2:
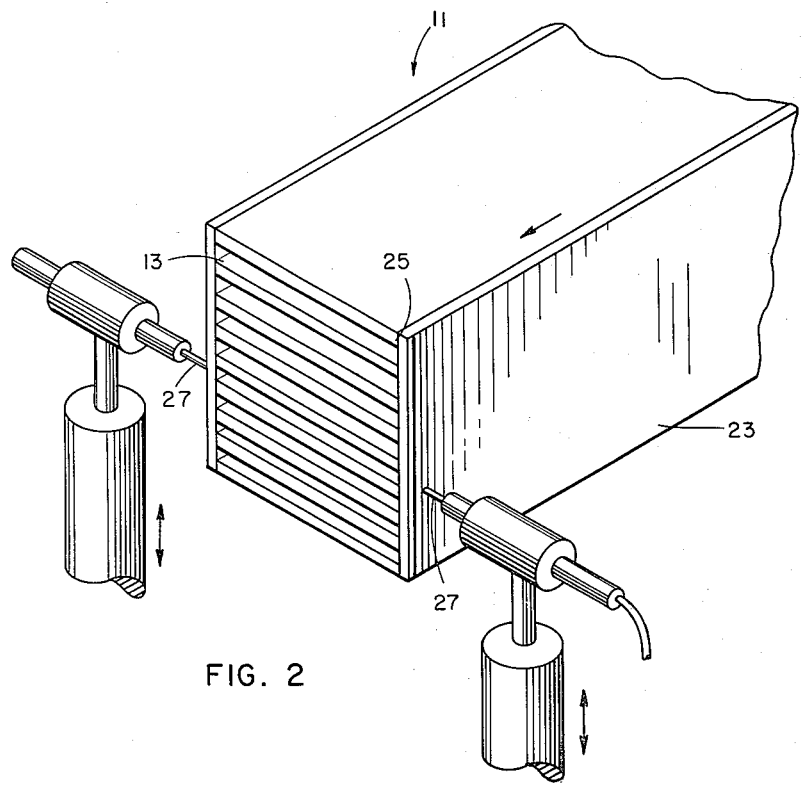
FIG. 2 is a partial isometric view of the fuel plate elements of FIG. 1 turned over 90° and welding means therefor in accordance with this invention.
Figure 4:
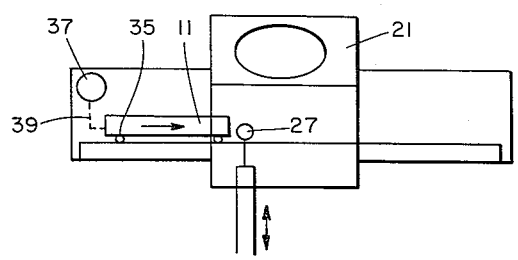
FIG. 4 is a schematic view of the apparatus of FIG. 3 from the side thereof.
Figure 3:
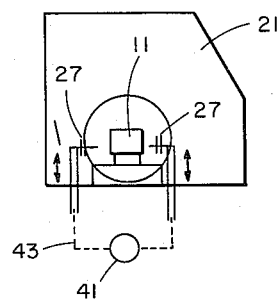
FIG. 3 is a schematic view of the apparatus of FIG. 2 showing means for moving the fuel elements and welding means relative to each other.

Referring to FIG. 1, in one advantageous application, fuel element assembly 11, operates in a conventional nuclear reactor such as the Shippingport neutronic reactor described in the above-mentioned United States Atomic Energy Commission description. Fuel plate elements 13 advantageously comprise Zircaloy cover plates 15 as envelopes for reactive fuel filler 17 as shown in FIG. 5. Heretofore, it has been necessary to provide fuel elements with I-beam cross-sections and to this end, the design steel flange strips have been welded on both sides of flat cover plates 15. During the fuel element assembly operation, the I-beam shaped fuel plate elements have been joined by fusion arc welding along the seams provided by the parallel butting flanges of adjacent fuel plates. A tungsten arc welding apparatus has been used for this purpose in a hermetically sealed argon filled welding chamber 21, such as is disclosed in the above-mentioned United States Atomic Energy Commission description. This system, however, has required expensive I-beam fuel plates, time-consuming welding totaling about ten hours for one normal welding cycle, it has necessitated weld seam tracking along the seams provided by the adjacent parallel fuel plate flanges and has resulted in serious manufacturing difficulties such as poor dimensional control.

In accordance with a preferred system of this invention, a plurality of longitudinally extending flat fuel plates 13 are spaced parallel to each other with spacers therebetween, non-fuel bearing side flat plates 23 are held normal to the ends 25 of said fuel plates 13 to form open-ended parallel enclosed channels 19, and welding means 27 is reciprocated transversely and moved longitudinally relative to said fuel plates so as to produce overlapping cross-welds that connect said fuel plates 13 and said side plates 23 and that bridge the channels 19 between said fuel plates.

Advantageously, suitable Ti-Namel, steel or copper spacers 31 separate the fuel plates 13 while suitable opposite stainless steel clamps 33 (one of which is shown in FIG. 1) hold the fuel plates in an assembly 11. Experiments have shown that the spacers 31 have minimized shrinkage during the welding operation as described in more detail hereinafter. The resistance to shrinkage results in water channels 19 having the same thickness as the spacers used. The side plates 23 may then be tack welded in air to the fuel plates 13.

For finish welding the assembly 11 is inserted in chamber 21 on a movable wheeled carriage 35. A suitable actuating means 37 such as a variable speed electrical motor 37 having a suitable drive or gear train network 39 and a suitable on-off input power control (not shown) causes the assembly 11 to move or be indexed longitudinally (horizontally for example) in chamber 21 at slow constant speed or predetermined periodic amounts.

Meanwhile, a suitable variable speed actuating means 41 such as an electric motor 41, having a suitable drive or gear train network 43 and variable input power control (not shown) or other equivalent actuating means, reciprocates arc welding means 27 at a constant speed back and forth transversely to said fuel elements at right angles to the movement of the carriage 35 (vertically for example) and maintains a constant feed rate of welding rods 27 to maintain a constant distance between rods 27 and side plates 23. The arc welding means is a suitable electric welding rod 27 having a suitable high power electrical energy source (not shown).

Advantageously, two like welding rods 27 are simultaneously reciprocated by actuating means 41 on opposite sides of assembly 11, although this invention permits the opposite sides to be welded separately. Actuating means 37 for assembly 11 moves the assembly 11 and is operable with means 41 so that overlapping parallel welded beads 47 are formed on the outside of side plate 23. The welding speed and carriage movement may be varied, but usually the carriage is moved incrementally slowly so that the adjacent beads 47 on the side of plate 23 are formed in opposite directions and in parallel overlapping relation as shown in FIG. 6 where the dotted lines represent a weld in a direction into the paper and the solid lines represent weld in the opposite direction. The speed of the welding rods 27 are controlled sufficiently to penetrate side plate 23 with welds that bridge the gap in each channel 19 between adjacent fuel elements 13 with an average bubble 45 through (see FIG. 5) of only 0.005" greater than the minimum weld wall. The shrinkage per seam with this system has been 0.001 compared to 0.006 to 0.012" obtained during the normal fusion welding known heretofore. It has been found also as an unexpected result that the small weld through bubble in accordance with this invention has the advantageous result of allowing an increased width of fuel filler 17 while maintaining sufficient integrity of the fuel element cladding. This in turn has the advantage of providing increased heat transfer area in the fuel element 13 while maintaining no weld penetration over fuel heat transfer surfaces.

The weld through bubble 45 through plates 13 and 23 has been on the average .005" more than the minimum weld wall which is determined, for example, by strength considerations. The maximum weld wall is determined, for example at .095", so that a maximum fuel filler 17 can be used with a minimum welding time. With this system, the assembly 11 has a completely welded crack-free high integrity precision side wall all along side plate 23, the fuel element and fuel element finishing costs are reduced, only one finish machining operation is required along the fuel element and side wall (a straddle-milling or broaching to width machining operation) and further, the welding time of one sequence has been reduced to about three-quarters of an hour. Also the side plate and welding system of this invention has the advantage that the weld can be extinguished and started at any place. In the absence of the side plate, as described in more detail hereinafter, the entire length of subassembly side wall must be welded continuously once welding has been initiated, whereas the use of the side plate allows the weld areas to be sequenced and programmed such that assembly can be welded in quarters, thirds, or any other division desired, even alternating side walls. Further, the side plate welding system of this invention permits programmed welding of long (100+inch) subassemblies and a corresponding minimization of distortions resultant from thermal and shrinkage stresses. Other advantages include the fact that cross-welding uses flat (unflanged) fuel elements (plates) eliminating fuel plate flanging and form milling, as well as manufacturing losses attendant with these operations. The use of flat elements tightly clamped with intervening channel spacers also eliminates dependence on the consistency of welding shrinkage for achieving channel space thickness in the welded product. Additionally, the channel spacers resist nearly all shrinkage, resulting in water channels having the same thickness as the spacers used. Still further advantages include the fact that reliance upon "seam tracking," that is, operator guidance of the welding-arc along the longitudinal seams between adjacent fuel element flanges, is entirely eliminated in cross welding. The weld arc traverses the fuel plate edges transversely using a predetermined stroke and index movement, achieving a high degree of automation and requiring a minimum of operator guidance and attenuation. All of these advantages result in improved product specifications, including minimum side wall thickness, no weld penetration over fuel heat transfer areas, and subassemblies entirely within boundary planes.

Figure 7:
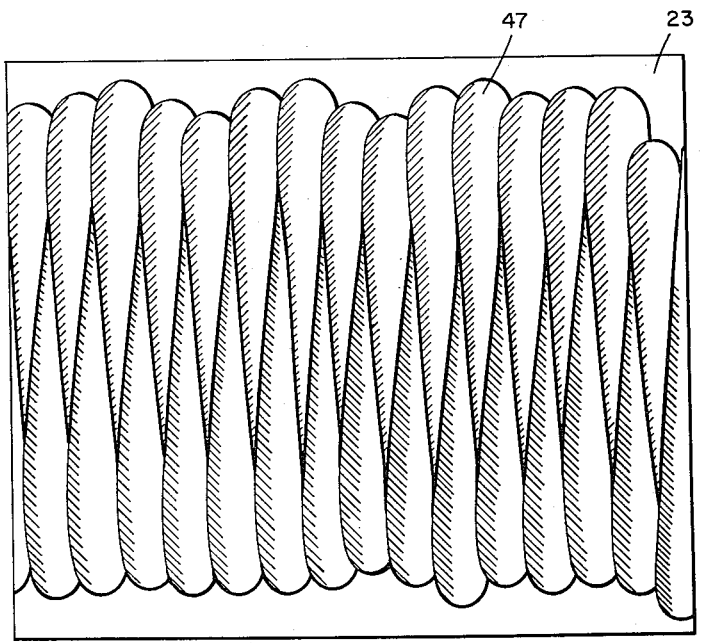
FIG. 7 is a partial top view of the cross-welds of FIG. 5.

In the operation of this invention, the flat fuel plates 13 are advantageously assembled in spaced apart relation with Ti-Namel steel or copper spacers and clamps 33 holding the plates in an assembly 11. Side plates 23 are held normal to the edges 25 of the fuel plates 13. Thereupon the assembly 11 is inserted in chamber 21, welding rods 27 are reciprocated in a plane transverse to the fuel plates 13 and assembly 11 is actuated longitudinally in set intervals in a direction at righ angles to the movement of rods 27 to form parallel cross-weld beads 47 that overlap themselves as shown from the top or outside of side plate 23 in FIG. 7. Plates 51 may be used adjacent assembly 11 to overrun the welding bead 47 off the ends of assembly 11.

To meet the minimum wall thickness required for the reactor, the side plate thickness and the speed of the welding components are set to provide for fusing the entire side plate and so that the side plate fuses into each and every water channel 19 and bridges the gap between the fuel element web surfaces as shown in FIG. 5. The welded surface is thus about at the position of the original interface between the fuel elements 13 and side plate 23. In this regard, the extent of weld penetration into the water channels 19, and hence the welded wall thickness, is determined by the exact welding conditions selected and the 0.095 inch weld penetration range allowance extends from the minimum wall (based on nominal external subassembly dimensions) to the weld-free zone in channels 19. Also, the boundary plane dimensional conditions within which the welded assembly must fit are met by adjustment of the initial location of the side plate, its thickness, and the welding conditions used. FIG. 5 indicates a typical arrangement for the side plate and fuel elements and the welding conditions for each case are set to yield a subassembly which is contained within the dimensional boundary planes and simultaneously meet the requirements for minimum wall thickness and penetration of the fuel filler.

In various assemblies, the following component sizes were used:

Fuel elements 0.076 inch thick x 3.438 inches wide x 48 inches long;
Side plates 0.060 inch thick x 16 inches long;
spacers 0.077 inch thick x 2.850 inches wide x 50 inches long.

In various assemblies the following cross welding conditions were used:

| Welding Assembly | Amps. | Volts | Cross-Travel, in./min. | Index Dimension |
| --- | --- | --- | --- | --- |
| CW-2 | 255±5 | 9 | 15 | 0.080 |
| CW-6 | 250±5 | 9 | 15 | 0.080 |

Total distortion of one assembly was 0.020 inch bow and 0.020 inch total twist and camber with 0.021 inch maximum fuel shift.

It is convenient to anneal the finish welded assembly 11 and then to remove the Ti-Namel spacers. Heretofore, the spacers have been removed by dissolving them in nitric acid to provide clear-through open-ended enclosed channels 19 between the fuel plates 13.

Figure 8:
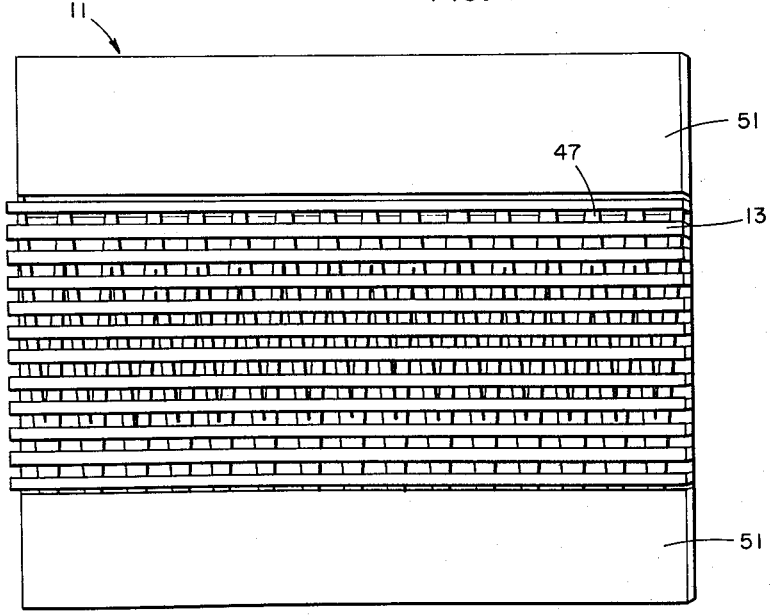
FIG. 8 is a partial bottom view of the cross-welds of FIG. 5.

It is understood that zig-zag cross-welds relative to the planes of the fuel plates may be formed as shown from the bottom of side plate 23 in FIG. 8 where the movement of carriage 11 has been continuous and speeded up for purposes of illustration to form a continuous zig-zag pattern.

It is also understood that the ends of fuel plates 13 can be tapered and these plate ends can fit into mating grooves 61 on the inside of side plates 23 as shown in FIG. 9 to help maintain the required finish tolerances. The ends 25 may also mate with rectangular grooves 61. Thereupon, the assembly 11 with suitable clamps and spacers may be used in combination with the described welding system to provide the described overlapping cross-weld. Normally, however, the system of this invention eliminates the need for such grooving or tapering.

It is also understood that the direction and speed of the welding means 27 and assembly 11 may be varied as desired to produce a continuous or intermitent overlapping cross-weld, and the described controlled transverse and longitudinal movements which produce beads 47 may be combined in either the welding means or the assembly 11 as is convenient.

It is understood still further that in another basically similar process, steel or copper channel spacers 31 may be clamped into intimate contact with fuel plates 13 and the side plates 23 eliminated. Thereupon, the described welding system can fuse the fuel plates and spacers into a monolithic side wall structure. In the absence of the side plate, however, the entire length of the subassembly side wall must be welded continuously once welding has been initiated.

This invention has the advantage of providing a close tolerance, strong, crack-free welded integral nuclear fuel element assembly with a closely controlled overlapping cross-weld between parallel spaced apart fuel plates and side plates normal to the edges thereof so as to provide open-ended enclosed parallel channels therein. Moreover, the system of this invention is simple, efficient, reduces the overall assembly time and component cost with standard components and equipment and tests have shown that the cross-weld of this invention can be obtained such that the fuel filler can be increased with standard size fuel plates.

What is claimed is:

1. A method of fabricating a nuclear reactor fuel element assembly comprising holding a plurality of longitudinally extending flat fuel elements in spaced parallel relation to eacht other, holding a substantially flat side plate so that corresponding ends of said elements are contiguous to one side of said plate, and passing a welding means along the other side of said plate in a direction transverse to the direction of the longitudinal extension of said elements, the setting and speed of travel of said welding means being such as to cause penetration of said side plate with welds that bridge the gap in each channel between adjacent fuel elements with a weld through bubble of predetermined size.

2. The method of claim 1 wherein said welding means is reciprocated in welding passes in said direction transverse to the longitudinal extension of said elements and indexed in a second direction normal to said transverse direction.

3. The method of claim 2 wherein each said pass and index movement is controlled to form parallel overlapping cross-welds.

4. The method of claim 1 wherein holding spacers are interposed between said fuel elements prior to passing said welding means along said plate.

5. The method of claim 1 wherein said one side of said side plate has grooves for receiving said ends of said fuel elements.

6. A fuel element assembly for a nuclear reactor comprising parallel flat spaced apart longitudinally extending fuel elements forming channels therebetween, flat side plates normal to said fuel elements at opposite ends thereof and joined to said fuel elements by welds which extend in a direction transverse to the direction of the longitudinal extension of said elements and have penetrated said side plates forming weld through bubbles of predetermined size, said weld through bubbles bridging the gap in each of said channels between adjacent fuel elements.

References Cited in the file of this patent

UNITED STATES PATENTS

| | | |
|---|---|---|
| 2,947,678 | Gimera et al. | Aug. 2, 1960 |
| 2,998,369 | Untermeyer | Aug. 29, 1961 |